(12) United States Patent
Sethi et al.

(10) Patent No.: US 12,732,536 B2
(45) Date of Patent: Sep. 8, 2026

(54) TCP SESSION HIJACKING PREVENTION

(71) Applicant: Dell Products L.P., Round Rock, TX (US)

(72) Inventors: Parminder Singh Sethi, Punjab (IN); Anay Kishore, Bangalore (IN); Malathi Ramakrishnan, Madurai (IN); Daniel L. Hamlin, Round Rock, TX (US); Praveen Kumar, Noida (IN)

(73) Assignee: Dell Products L.P., Round Rock, TX (US)

( * ) Notice: Subject to any disclaimer, the term of this patent is extended or adjusted under 35 U.S.C. 154(b) by 265 days.

(21) Appl. No.: 18/537,537

(22) Filed: Dec. 12, 2023

(65) Prior Publication Data

US 2025/0193234 A1 Jun. 12, 2025

(51) Int. Cl.
*H04L 9/40* (2022.01)

(52) U.S. Cl.
CPC ...... *H04L 63/1466* (2013.01); *H04L 63/0245* (2013.01); *H04L 63/123* (2013.01)

(58) Field of Classification Search
CPC ............. H04L 63/1466; H04L 63/0245; H04L 63/123
See application file for complete search history.

(56) References Cited

U.S. PATENT DOCUMENTS

2014/0189842 A1* 7/2014 Wang ...................... H04L 63/02 726/11
2022/0191193 A1* 6/2022 Hamilton ............. H04L 63/029

* cited by examiner

*Primary Examiner* — Izunna Okeke
(74) *Attorney, Agent, or Firm* — Jackson Walker L.L.P.

(57) ABSTRACT

An information handling system may include at least one processor and a memory. The information handling system may be configured to: implement a transmission control protocol (TCP) edge client (TEC) configured to be deployed within a datacenter between a firewall and an internal datacenter network switch; wherein the TEC is configured to: receive information from a plurality of TCP clients external to the datacenter; validate the information; and in response to the information being validated, pass the information to a destination internal to the datacenter via the internal datacenter network switch.

15 Claims, 3 Drawing Sheets

TCP SESSION HIJACKING PREVENTION

TECHNICAL FIELD

The present disclosure relates in general to information handling systems, and more particularly to detecting and preventing hijacking of transmission control protocol (TCP) sessions.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well as other contexts), information handling systems may execute virtual machines (VMs) for various purposes. A VM may generally comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

In HCI as well as non-HCI systems, TCP connections are often used for network data transmission. TCP is one of the main targets used in different types of network attacks. Making the TCP session process more secure and resilient is as there are several types of attacks very important, related to TCP sessions as well. Cross site scripting, session fixation, session side-jacking, session ID prediction, session sniffing, and others are currently the main attacks being used in the field that are related to TCP sessions. An attacker might try to perform one or many of these attacks to disrupt services or steal precious information.

Thus embodiments of this disclosure are directed to making TCP sessions more secure.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with TCP sessions may be reduced or eliminated.

In accordance with embodiments of the present disclosure, an information handling system may include at least one processor and a memory. The information handling system may be configured to: implement a transmission control protocol (TCP) edge client (TEC) configured to be deployed within a datacenter between a firewall and an internal datacenter network switch; wherein the TEC is configured to: receive information from a plurality of TCP clients external to the datacenter; validate the information; and in response to the information being validated, pass the information to a destination internal to the datacenter via the internal datacenter network switch.

In accordance with these and other embodiments of the present disclosure, a method may include an information handling system implementing a transmission control protocol (TCP) edge client (TEC) configured to be deployed within a datacenter between a firewall and an internal datacenter network switch; the information handling system receiving, at the TEC, information from a plurality of TCP clients external to the datacenter; the information handling system validating the information at the TEC; and in response to the information being validated, the information handling system passing the information from the TEC to a destination internal to the datacenter via the internal datacenter network switch.

In accordance with these and other embodiments of the present disclosure, an article of manufacture may include a non-transitory, computer-readable medium having computer-executable instructions thereon that are executable by a processor of an information handling system for: implementing a transmission control protocol (TCP) edge client (TEC) configured to be deployed within a datacenter firewall and an internal datacenter network between a switch; receiving, at the TEC, information from a plurality of TCP clients external to the datacenter; validating the information at the TEC; and in response to the information being validated, passing the information from the TEC to a destination internal to the datacenter via the internal datacenter network switch.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
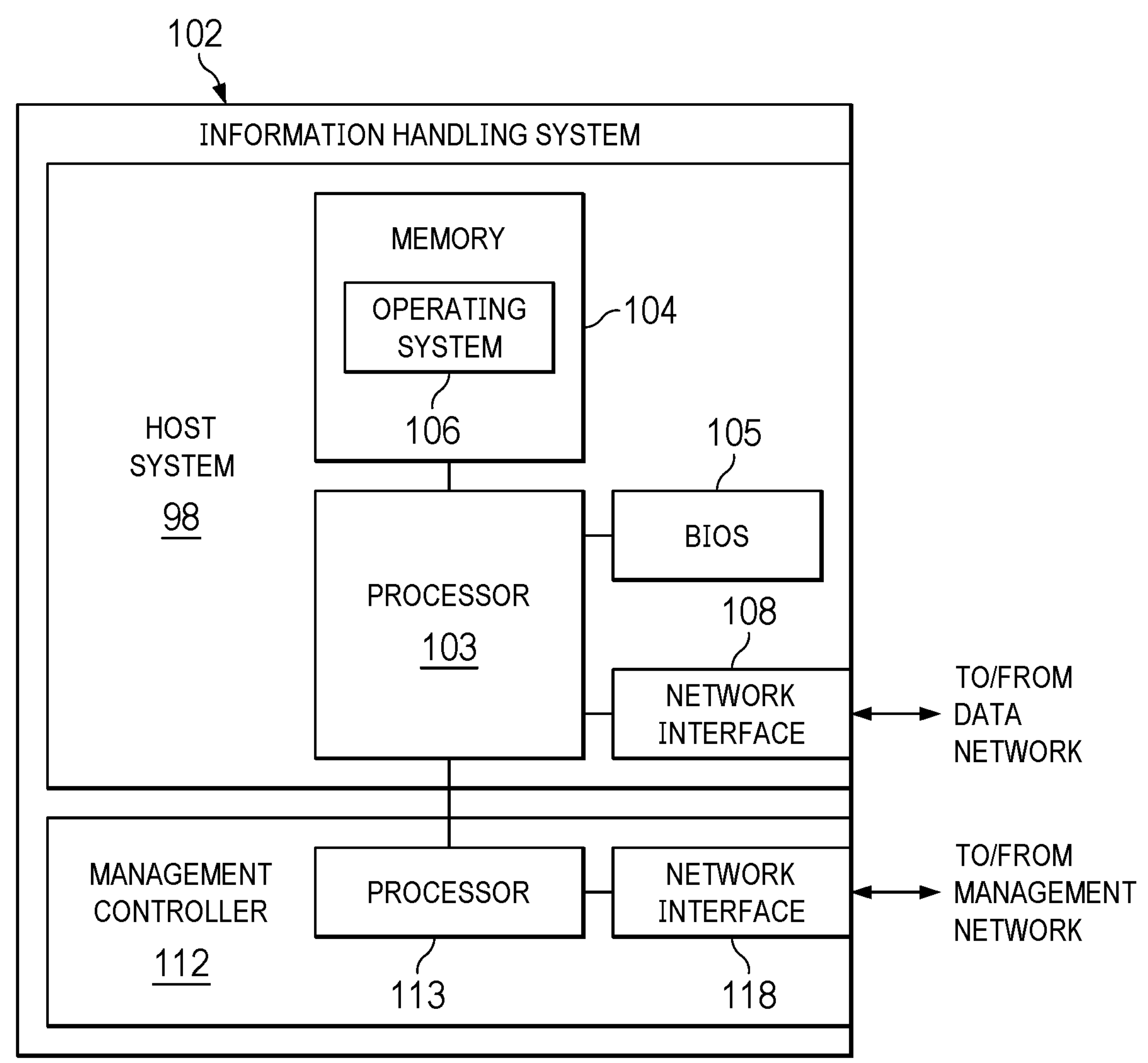
FIG. 1 illustrates a block diagram of an example information handling system, in accordance with embodiments of the present disclosure.
Figure 2:
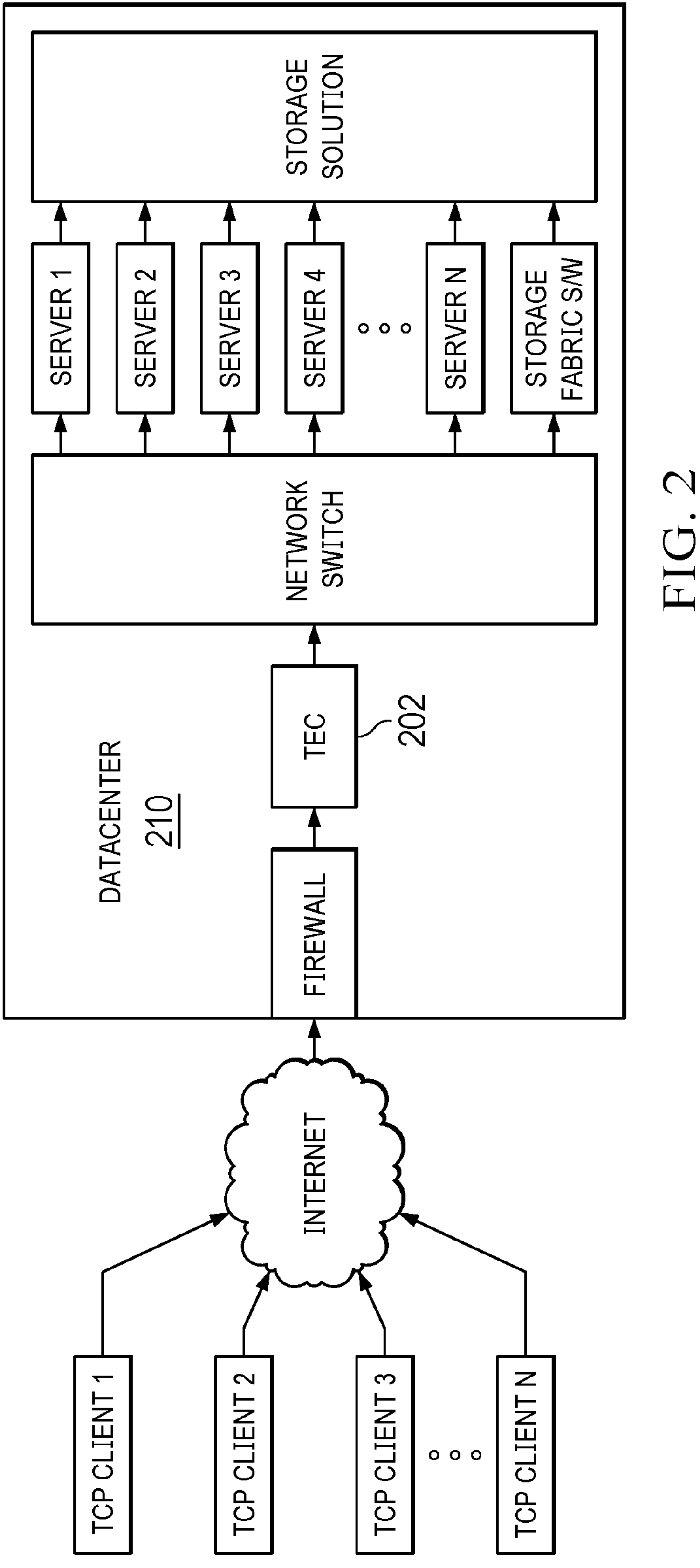
FIGS. 2-3 illustrate block diagrams of example architectures, in accordance with embodiments of the present disclosure.
Figure 3:
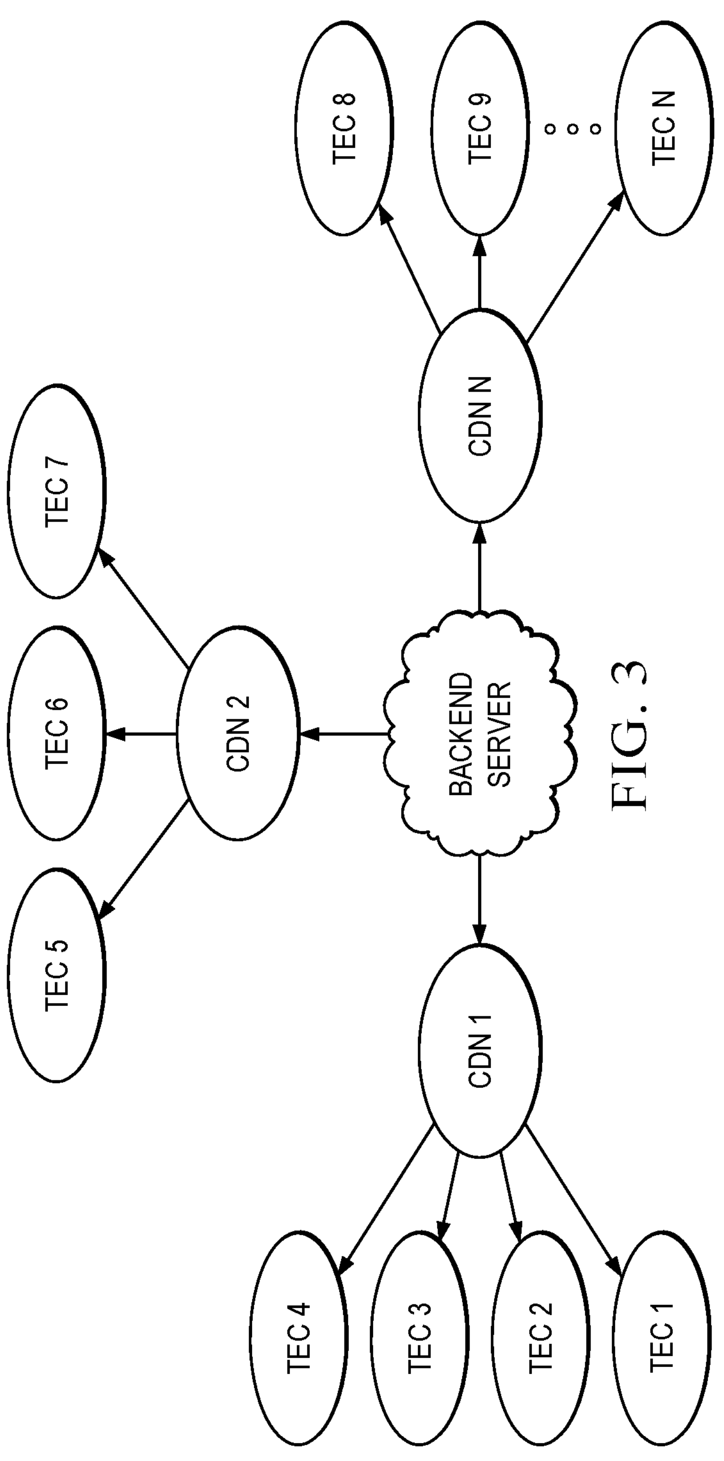

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure provide improvements in the management of network sessions such as TCP sessions in information handling systems 102 (e.g., edge nodes). It should be noted that while the scenario of an edge deployment is discussed in detail herein for the sake of concreteness, other embodiments are also specifically contemplated within the scope of this disclosure.

Improvements to TCP session security may be classified into three major sub-categories, each with its own challenges:

1. Making the process of TCP session validation more secure. In particular, while there may be several ways to handle TCP sessions on the client side, handling the server-side validation is more complicated. Clients may be encouraged to implement certain types of methods and parameters, which may then be validated at the server side. With the amount of validation that is happening around a web service within the datacenter, adding any new validation may also have an impact on performance.
2. Tracking the massive number of TCP sessions over a huge number of device types: the web services deployed within a datacenter can generally be accessed by a large number of device types and web browsers. Providing support to all those client types can open up new unknown ways for attackers to trigger attacks. Also, because of the large number of TCP sessions that can be in use concurrently, it is difficult to track all those sessions and validate them for vulnerabilities without any having service interruptions.
3. Tracking different TCP session failures and learning from them: the TCP session tracking and validations can report a wide range of failed attempts that were done on the web services/applications. It is important to have a system in place to track these failures and understand the evolving threat management paradigm.

Embodiments of this disclosure may provide security, scalability, and learning in this context. An edge computing-based solution may be used for implementation, and as discussed in more detail below, it may include one or more of the following components in some embodiments.

TCP Edge Client (TEC): the TCP edge client is a deployable component for datacenters where web services are hosted. It may be placed as a hop between an existing security system (e.g., a firewall) and the web services and/or applications that are hosted in the datacenter. The TEC may also have the feature of a bidirectional proxy built in to make the overall communications more secure.

Content distribution network (CDN) servers: these servers may be deployed based on the business operation needs of customers. These servers may have direct connectivity with the TECs and may also be connected to the manufacturer backend servers for achieving security and predictive analysis objectives.

Backend server: the manufacturer backend server may be centrally deployed and may be directly connected to the CDN servers. It may accept all types of logs collected from TECs and perform predictive analysis on them. Based on such analysis, it may provide updated threat definitions to the CDN servers, which may then be distributed to the TECs connected thereto.

FIG. 2 provides an example architecture diagram, showing the TEC 202 placed between the firewall and the switch in datacenter 210. All TCP requests originating from various TCP clients via the Internet may be routed through TEC 202 for validation. The bidirectional proxy implemented in TEC 202 may also filter out unwanted TCP connections based on configurable parameters.

FIG. 3 provides an example diagram showing the manufacturer's backend server connected to CDN servers, which are connected to TECs.

According to one embodiment, TCP validation in the context of FIGS. 2 and 3 may include the following three steps, which may be carried out by the TECs:

Step 1: Scan data packets and validate the TCP header for structural abnormalities, including:

A. Verify that Transport Layer Security (TLS) is used

B. Verify different flags and header fields, along with their sizes

C. Verify relevance of code bits data [SYN, ACK, FIN, PSH, RST, URG, etc.]

D. Verify the reserved field and checksum size

E. Verify packet data against windows size field (flow control)

F. Filter data with the urgent flag [URG]

G. Validate the second factor authentication present (cross site request forgery (CSRF) token)

H. Validate that the session ID is present

Step 2: Validate the TCP session and CSRF token, including:

A. Validate that the TCP session ID is active, and if a terminated session is not being used B. Validate the second factor authentication CSRF token received from client side Step 3: Deeper analysis and request processing, including:

A. Handling all the transport layer TCP handshakes

B. Use TLS level encryption for all TCP traffic

C. Calculate the CSRF token, store it in a local database, and validate its value when it comes back from the client side D. Allocate system resources to the connection socket/request only after the validation of session and CSRF from client is done E. Additional validation to make sure that a session and its relevant cookie is terminated correctly after closure of the socket connection The TECs may also perform logging based on any of the steps discussed above, passing information to the backend server via the CDN servers. The backend server may perform machine learning or any other suitable procedures to learn about evolving threats and improve the validation processes being carried out by the TECs.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that 10 structure is "configured to" or "operable to" perform one or more tasks is expressly intended not to invoke 35 U.S.C. § 112 (f) for that claim element. Accordingly, none of the claims in this application as filed are intended to be interpreted as having means-plus-function elements. Should Applicant wish to invoke § 112 (f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without t limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:

at least one processor; and a memory;

wherein the information handling system is configured to:

implement a transmission control protocol (TCP) edge client (TEC) configured to be deployed within a datacenter between a firewall and an internal datacenter network switch;

wherein the TEC is configured to:

receive information from a plurality of TCP clients external to the datacenter;

validate the information, wherein validating the information includes checking a TCP header for abnormalities by verifying that transport layer security (TLS) is enabled and verifying that a session ID is present, and further includes validating a TCP session and a cross-site request forgery (CSRF) token; and in response to the information being validated, pass the information to a destination internal to the datacenter via the internal datacenter network switch.

2. The information handling system of claim 1, wherein the information handling system is an element of a hyper-converged infrastructure (HCI) system.

3. The information handling system of claim 2, wherein the datacenter is an edge deployment of the HCI system.

4. The information handling system of claim 1, wherein validating the information further includes at least one additional analysis.

5. The information handling system of claim 1, wherein the TEC is configured to communicate results of the validation of the information to a backend server via a content distribution network (CDN) server.

6. A method comprising:

an information handling system implementing a transmission control protocol (TCP) edge client (TEC) configured to be deployed within a datacenter between a firewall and an internal datacenter network switch;

the information handling system receiving, at the TEC, information from a plurality of TCP clients external to the datacenter;

the information handling system validating the information at the TEC, wherein validating the information includes checking a TCP header for abnormalities by verifying that transport layer security (TLS) is enabled and verifying that a session ID is present, and further includes validating a TCP session and a cross-site request forgery (CSRF) token; and in response to the information being validated, the information handling system passing the information from the TEC to a destination internal to the datacenter via the internal datacenter network switch.

7. The method of claim 6, wherein the information handling system is an element of a hyper-converged infrastructure (HCI) system.

8. The method of claim 7, wherein the datacenter is an edge deployment of the HCI system.

9. The method of claim 6, wherein validating the information further includes at least one additional analysis.

10. The method of claim 6, wherein the TEC is configured to communicate results of the validation of the information to a backend server via a content distribution network (CDN) server.

11. An article of manufacture comprising a non-transitory, computer-readable medium having computer-executable instructions thereon that are executable by a processor of an information handling system for:

implementing a transmission control protocol (TCP) edge client (TEC) configured to be deployed within a datacenter between a firewall and an internal datacenter network switch;

receiving, at the TEC, information from a plurality of TCP clients external to the datacenter;

validating the information at the TEC, wherein validating the information includes checking a TCP header for abnormalities by verifying that transport layer security (TLS) is enabled and verifying that a session ID is present, and further includes validating a TCP session and a cross-site request forgery (CSRF) token; and in response to the information being validated, passing the information from the TEC to a destination internal to the datacenter via the internal datacenter network switch.

12. The article of claim 11, wherein the information handling system is an element of a hyper-converged infrastructure (HCI) system.

13. The article of claim 12, wherein the datacenter is an edge deployment of the HCI system.

14. The article of claim 11, wherein validating the information further includes at least one additional analysis.

15. The article of claim 11, wherein the TEC is configured to communicate results of the validation of the information to a backend server via a content distribution network (CDN) server.

* * * * *